ABSTRACT OF THE DISCLOSURE

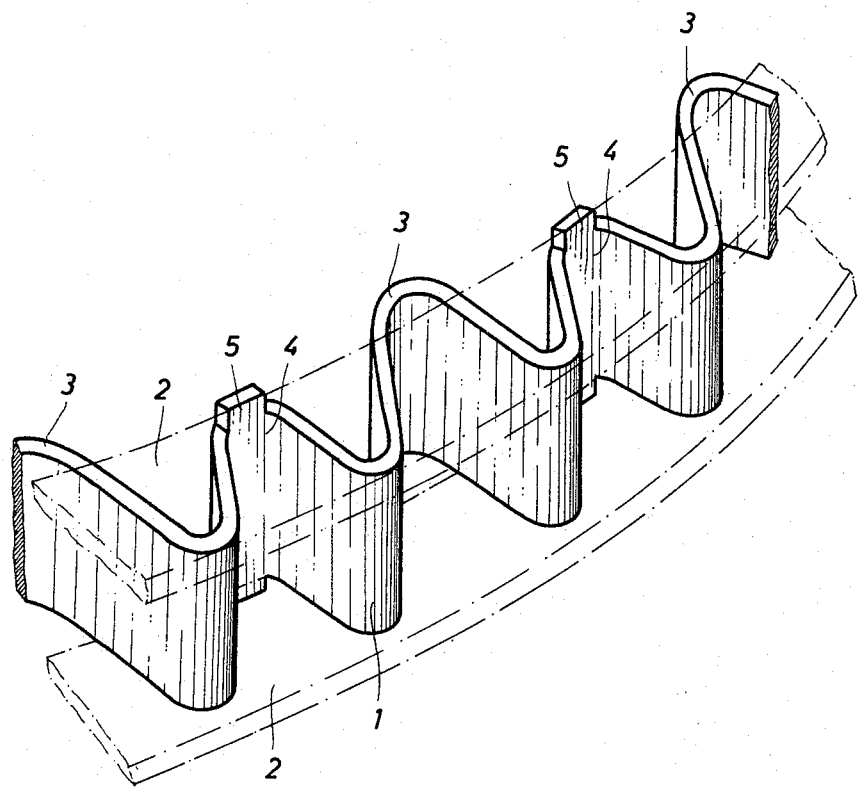
Inventor
Lothar WIEMANN 3,329,421
SEALING DEVICE
Lothar Wiemann, Burscheid, Cologne, Germany, assignor to Goetzewerke Friedrich Goetze A.G., Dusseldorf, Germany
Filed June 29, 1965, Ser. No. 467,959
Claims priority, application Germany, Oct. 6, 1964, G 41,705
4 Claims. (Cl. 267—1.5)

A retaining spring having meandering wide and narrow undulations is interposed as a support between two thin piston rings. The webs at the inner apexes of the narrow undulations have axial projections which abut against the inner peripheries of each of the piston rings.

Specification

The present invention relates to sealing devices, and especially to a tension spring for use with piston rings.

More particularly, the present invention relates to a tangentially and radially resilient retaining spring, whose meandering and radially extending undulations axially and radially support band-shaped oil wiper rings, i.e., so-called piston rings.

There exist piston seals for use with cylinders of four-cycle internal combustion engines, which seals comprise two steel band-shaped rings which, in axial direction, are thin, these bands being supported axially and radially by means of a meandering retaining spring which has radially extending portions and which lies between the two rings. In these piston seals, the retaining spring has alternating so-called "high," i.e., radially wide, and "low," i.e., radially narrow, undulations, the wide undulations being those which serve to support the rings axially and the narrow undulations being those which tension and clamp the rings in radial direction. In heretofore conventional springs of this type, the narrow undulations do not lie against the faces of the piston rings.

A particularly good oil seal is obtained when the band or sheet-like rings are, in radial direction, as narrow as possible. At the same time, the undulations of the retaining spring should not be too flat, as this would result in too much tangential stiffness of the spring. Also, the thin rings should overlie large portions of the area outlined by the spring, thereby substantially to reduce the danger that the spring wears into the rings at the points of interengagement. Finally, the points at which the area of the spring undulations are concentrated should lie within the outline of the rings in order to prevent tilting movements of the meander-shaped spring under the influence of acceleration forces to which the reciprocating piston is subjected.

It is, therefore, the primary object of the present invention to provide a spring which is capable of providing the above advantages and, with this object in view, the present invention resides mainly in a retaining spring having meandering wide and narrow undulations extending in radial direction for supporting band-shaped piston rings in axial and radial directions, which spring is provided with webs arranged at the inner apexes of the narrow undulations, these webs abutting against the inner peripheries of the piston rings.

Additional objects and advantages of the present invention will become apparent upon consideration of the following description when taken in conjunction with the accompanying drawing in which the single figure is a fragmentary perspective view of a spring according to the present invention.

Referring now to the drawing, the same shows a generally sinusoidal retaining spring 1 for tensioning and holding in place two band-shaped or thin, plate-like rings 2, whose outline is shown in phantom lines. The spring 1 has alternating "high," or radially wide, undulations 3 and "low," or radially narrow, undulations 4. The greater part of each of the wide undulations 3 lies against the faces of the ring 2, while the entire length of each of the narrow undulations 4—except for its innermost axial web—lies against the faces of the rings 2. The webs which constitute the inner apexes of the respective undulations have projections which extend in axial direction from the main body of the spring and which bear against the inner periphery of each of the rings 2.

It will thus be seen that in the piston ring assembly according to the present invention the spring fulfills the requirements set forth above, in that the rings 2 may be narrow, in radial direction; the undulations of the spring according to the present invention are not so large as to provide excessive tangential stiffness; the rings overlie large portions of the area occupied by the spring; and the points at which the area of the spring undulations are concentrated lie within the outline of the rings.

It will be understood that the above description of the present invention is susceptible to various modifications, changes, and adaptations, and the same are intended to be comprehended within the meaning and range of equivalents of the appended claims. For example, the undulations need not be sinusoidal, as depicted in the drawing, nor need each individual wide undulation alternate with each individual narrow undulation.

What is claimed is:

1. A piston ring assembly comprising band-shaped piston rings and a retaining spring having meandering wide and narrow undulations extending in radial direction for supporting the band-shaped piston rings in axial and radial direction, said spring being provided with webs arranged at the inner apexes of said narrow undulations, said webs being relatively narrow and abutting against the inner peripheries of the piston rings.

2. A piston ring assembly as defined in claim 1 wherein said undulations are generally sinusoidal.

3. A piston ring assembly as defined in claim 1 wherein said narrow and wide undulations alternate with each other.

4. A piston ring assembly as defined in claim 1 wherein said webs have projections which extend in axial direction from the main body of the spring, said axial web projections being relatively narrow and relatively flat, the inner peripheries of the piston rings being contacted by said axial projection of said webs.

References Cited

UNITED STATES PATENTS

| 2,560,668 | 7/1951 | Stevenson | 277—139 |
| 2,917,353 | 12/1959 | Baumler | 267—1.5 |
| 3,195,905 | 7/1965 | Brenneke | 277—140 |

FOREIGN PATENTS

| 917,129 | 1/1963 | Great Britain. |

ARTHUR L. LA POINT, *Primary Examiner.*

R. M. WOHLFARTH, *Assistant Examiner.*